(12) United States Patent
Sasaki

(10) Patent No.: US 7,596,063 B2
(45) Date of Patent: Sep. 29, 2009

(54) DEFECT MANAGEMENT METHOD, REPRODUCTION METHOD, RECORDING MEDIUM, INFORMATION RECORDING APPARATUS, AND INFORMATION REPRODUCTION APPARATUS

(75) Inventor: Yoshiyuki Sasaki, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 777 days.

(21) Appl. No.: 11/074,866

(22) Filed: Mar. 9, 2005

(65) Prior Publication Data
US 2005/0201229 A1 Sep. 15, 2005

(30) Foreign Application Priority Data
Mar. 11, 2004 (JP) ............................. 2004-068427
Apr. 5, 2004 (JP) ............................. 2004-110692

(51) Int. Cl.
*G11B 5/09* (2006.01)
(52) U.S. Cl. .................................. 369/47.14; 369/53.16
(58) Field of Classification Search .............. 369/47.14, 369/53.16
See application file for complete search history.

(56) References Cited

U.S. PATENT DOCUMENTS

| 6,560,181 | B1 | 5/2003 | Takahashi | |
|---|---|---|---|---|
| 6,690,634 | B2* | 2/2004 | Yeo et al. | 369/53.29 |
| 6,711,106 | B2 | 3/2004 | Sasaki | |
| 7,209,418 | B2* | 4/2007 | Park et al. | 369/47.33 |
| 2002/0114245 | A1 | 8/2002 | Sasaki | |
| 2002/0159353 | A1 | 10/2002 | Sasaki | |
| 2003/0033475 | A1 | 2/2003 | Sasaki | |
| 2003/0103427 | A1* | 6/2003 | Yeo et al. | 369/47.14 |
| 2003/0133369 | A1 | 7/2003 | Sasaki | |
| 2003/0163638 | A1 | 8/2003 | Sasaki | |
| 2003/0223338 | A1 | 12/2003 | Sasaki | |
| 2004/0057366 | A1 | 3/2004 | Sasaki | |
| 2004/0090886 | A1 | 5/2004 | Sasaki | |
| 2004/0133739 | A1 | 7/2004 | Sasaki | |
| 2004/0160875 | A1 | 8/2004 | Sasaki | |
| 2004/0165499 | A1 | 8/2004 | Sasaki | |
| 2004/0213117 | A1 | 10/2004 | Sasaki | |

(Continued)

FOREIGN PATENT DOCUMENTS

JP 2000-040306 2/2000

(Continued)

OTHER PUBLICATIONS

JP 2000-322835 Itou Motoyuki Nov. 2000.*

*Primary Examiner*—Wayne R Young
*Assistant Examiner*—Van N Chow
(74) *Attorney, Agent, or Firm*—Dickstein Shapiro LLP

(57) ABSTRACT

A method of managing a defective area in an information recording medium having a user data area, a replacement area, and a defect management information area is disclosed. The method manages the defective area using a block of a predetermined size as a unit of management. The method includes the step of, at the time of replacing a defective block including the defective area with a replacement block of the replacement area, dividing the replacement block into multiple sub-blocks, and setting identification information for identifying a first one of the sub-blocks to which data is relocated from the defective block and a second one of the sub-blocks to which no data is relocated from the defective block. The identification information is set in defect management information.

32 Claims, 13 Drawing Sheets

U.S. PATENT DOCUMENTS

| | | | |
|---|---|---|---|
| 2005/0018572 A1* | 1/2005 | Gushima et al. | 369/53.15 |
| 2005/0030852 A1 | 2/2005 | Sasaki | |
| 2005/0030873 A1 | 2/2005 | Sasaki | |
| 2005/0030874 A1 | 2/2005 | Sasaki | |
| 2005/0036422 A1 | 2/2005 | Sasaki | |
| 2008/0175118 A1* | 7/2008 | Hwang et al. | 369/53.17 |

FOREIGN PATENT DOCUMENTS

| | | |
|---|---|---|
| JP | 2000-322835 | 11/2000 |
| JP | 2001-143399 | 5/2001 |

* cited by examiner

FIG.4A

| STATE | DEFECTIVE BLOCK ADDRESS | RESERVED | REPLACEMENT BLOCK ADDRESS | BIT MAP |
|---|---|---|---|---|

FIG.4B

| STATE 1 | STATE 2 | CONTENTS |
|---|---|---|
| 0000b | 00xxb | INDICATE THAT REPLACEMENT LIST IS VALID. THERE IS DATA RELOCATION. |
| 0001b | 0000b | INDICATE THAT REPLACEMENT LIST IS VALID. THERE IS NO DATA RELOCATION. |
| 0010b | 0000b | INDICATE THAT REPLACEMENT LIST IS UNUSED. |
| 0011b | 0000b | INDICATE THAT REPLACEMENT LIST IS DEFECTIVE. |
| OTHERS | OTHERS | RESERVED |

| STATE 2 | CONTENTS |
|---|---|
| 00x0b | INDICATE THAT SAME DATA IS RECORDED IN DEFECTIVE BLOCK AND REPLACEMENT BLOCK. |
| 00x1b | INDICATE THAT DATA RECORDED IN DEFECTIVE BLOCK IS DIFFERENT FROM DATA RECORDED IN REPLACEMENT BLOCK. |
| 000xb | INDICATE THAT DATA OF ALL SECTORS OF DEFECTIVE BLOCK ARE RELOCATED. |
| 001xb | INDICATE THAT DATA OF DEFECTIVE BLOCK IS PARTIALLY RELOCATED. |
| OTHERS | RESERVED |

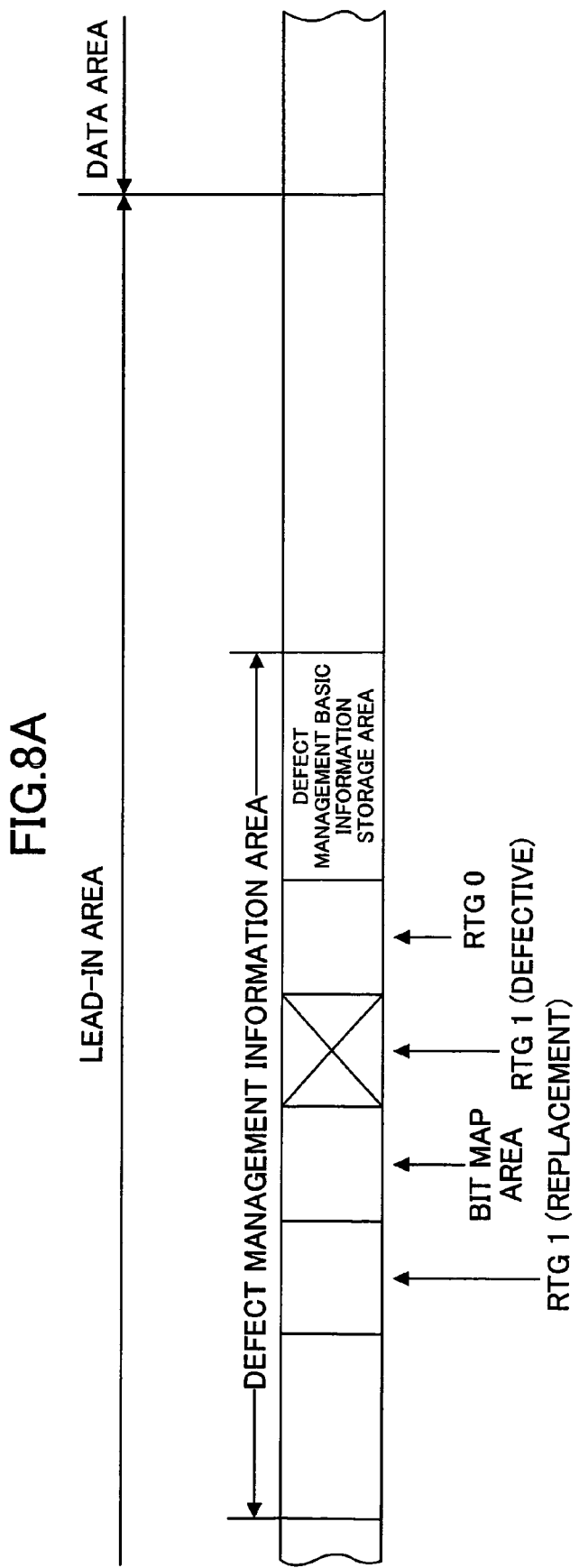

FIG.8B

| CONTENTS | NUMBER OF BYTES |
|---|---|
| IDENTIFICATION ID | 3 |
| VERSION NUMBER | 1 |
| UPDATE COUNT | 4 |
| SA1 SIZE | 2 |
| SA2 SIZE | 2 |
| NUMBER OF REPLACEMENT TABLE GROUPS | 1 |
| RTG0 POSITION INFORMATION | 3 |
| RTG1 POSITION INFORMATION | 3 |
| BIT MAP AREA POSITION INFORMATION | 3 |
| SA2 BYTE OFFSET INFORMATION | 2 |
| BIT MAP SIZE | 2 |
| RESERVED | |

FIG.10A

| CONTENTS | NUMBER OF BYTES |
|---|---|
| IDENTIFICATION ID | 3 |
| VERSION NUMBER | 1 |
| UPDATE COUNT | 4 |
| SA1 SIZE | 2 |
| PARTIAL UDA SIZE | 2 |
| SA2 SIZE | 2 |
| NUMBER OF REPLACEMENT TABLE GROUPS | 1 |
| RTG0 POSITION INFORMATION | 3 |
| RTG1 POSITION INFORMATION | 3 |
| RESERVED | |

FIG.10B

| CONTENTS | NUMBER OF BYTES |
|---|---|
| IDENTIFICATION ID | 3 |
| REPLACEMENT LIST TABLE NUMBER | 1 |
| UPDATE COUNT | 4 |
| NUMBER OF REPLACEMENT LISTS | 2 |
| STORAGE POINTER OF UNUSED REPLACEMENT LIST | 2 |
| STORAGE POINTER OF DEFECTIVE REPLACEMENT LIST | 2 |
| DEFECTIVE BLOCK ADDRESS 1 | 3 |
| DEFECTIVE BLOCK ADDRESS 2 | 3 |
| UNUSED REPLACEMENT BLOCK ADDRESS 1 | 3 |
| UNUSED REPLACEMENT BLOCK ADDRESS 2 | 3 |
| BIT MAP POSITION INFORMATION | 3 |
| BIT MAP SIZE | 2 |
| BIT MAP BLOCK ADDRESS | 2 |
| REPLACEMENT LIST 1 | 6 |
| ... | ... |
| REPLACEMENT LIST n | 6 |
| RESERVED | |

DEFECT MANAGEMENT METHOD, REPRODUCTION METHOD, RECORDING MEDIUM, INFORMATION RECORDING APPARATUS, AND INFORMATION REPRODUCTION APPARATUS

BACKGROUND OF THE INVENTION

1. Field of the Invention

The present invention generally relates to defect management methods, reproduction methods, recording media, information recording apparatuses, and information reproduction apparatuses, and more particularly to a defect management method managing a defective area in an information recording medium, a reproduction method reproducing data from an information recording medium, a recording medium on which a program used in an information recording apparatus and an information reproduction apparatus is recorded, an information recording apparatus recording data on an information recording medium, and an information reproduction apparatus reproducing data from an information recording medium.

2. Description of the Related Art

Optical disks such as CDs (compact disks) and DVDs (digital versatile disks) have attracted attention as information recording media for recording data. As a result, optical disk units have been widely used as information recording apparatuses for recording data on optical disks and information reproduction apparatuses for reproducing data from optical disks.

Recordable CDs include CD-Rs and CD-RWs, and recordable DVDs include DVD-Rs, DVD+Rs, DVD-RWs, DVD+RWs, and DVD-RAMS. Data are recorded on and reproduced from these CDs and DVDs in compliance with their respective predetermined standards.

Conventionally, to those of a rewritable type of the above-described information recording media, defect management is applied as means for ensuring the reliability of recorded data. According to this defect management, a list relating a defective portion of an information recording medium with an area used instead of this defective portion is recorded in a predetermined replacement (spare) area of the recording medium. Control is performed so as to avoid use of the defective portion by referring to the list at the time of subsequent information recording and reproduction.

Next, a brief description is given of methods of replacing a defective area in defect management. Slipping and linear replacement are two types of methods that are generally employed to replace a defective area in defect management. Slipping detects a defective area, and uses the subsequent area instead of the defective area. Once "slipping (replacement)" occurs, each of a logical address accompanying data and a physical address indicating an area location slips by one. Linear replacement detects a defective area, and uses a replacement area pre-reserved in a location physically apart from the defective area. Linear replacement, in which the defective area and the replacement area to replace the defective area are physically apart from each other, may take more time to access the replacement area than slipping. In the DVD-RAM, for instance, slipping is applied to a primary defect, that is, a defect detected in disk initialization (formatting), and linear replacement is applied to a secondary defect, that is, a defect detected during recording of user data after the initialization. That is, both slipping and linear replacement are employed in the DVD-RAM. The defect information of the primary defect is recorded in a primary defect list (PDL), and the defect information of the secondary defect is recorded in a secondary defect list (SDL). In the DVD+RW, only linear replacement is applied.

The DVD+RW or DVD-RAM standards allow a user to request recording of data in the units of sectors. In the actual case of recording on an optical disk, however, the recording is performed using a recording block of a predetermined size called "ECC block" as a unit of recording. The ECC block is formed of a user data sector composed of 16 sectors. Accordingly, when the user requests data to be recorded in a sector, the data of an ECC block including the sector is temporarily read out from the optical disk, the read-out data is overwritten with the requested data, and the overwritten data is written back to the optical disk in the unit of the ECC block (recording block). This operation is referred to as RMW (read-modify-write).

When a secondary defect (a defect during recording of user data) is detected in the DVD-RAM or DVD+RW), the data is relocated to a replacement area in the units of ECC blocks. Accordingly, a replacement list for managing a defect is provided for each ECC block. That is, even if only a portion of the sectors of the ECC block is defective, the entire data of the ECC block is recorded in the replacement area. This is because if the ECC block includes a defective sector, it is highly probable that the data of the other sectors of the ECC block may not be read out either since data is subjected to error correction in the units of ECC blocks in the DVDS.

Therefore, if an error occurs in reading out the ECC block and the data of the ECC block cannot be read out during the above-described RMW operation, inconveniently, the ECC block cannot be replaced because all the data of the ECC block are not retained. Even if only the data that the user requests to be recorded in the sector is relocated to a replacement area, there is no choice but to record dummy data in the replacement area with respect to the other sectors. Therefore, if the user makes a request to reproduce data from a sector of the ECC block with respect to which the dummy data is recorded in the replacement area as a result of such data relocation, wrong data is returned to the user.

For instance, if the replacement list is to be prepared for each sector in order to cope with the above-described inconvenience, the number of replacement lists is 16 times that of the conventional method of performing defect management in the units of ECC blocks since each ECC block has 16 sectors. Accordingly, a large-capacity memory is required to retain such defect management information. Further, as described above, if an ECC block includes a defective sector, it is highly probable that the data of the other sectors of the ECC block may not be read out either. As a result, data is recorded in a replacement area in the units of ECC blocks. Accordingly, considering memory capacity, retaining a defect list for each sector has more demerits than merits.

Japanese Laid-Open Patent Application No. 2000-322835 discloses an apparatus for managing a defect of an information recording medium considering the presence or absence of data relocation (recording data in a replacement area instead of a defective area). This apparatus sets flag information indicating whether a defective area is replaced by a replacement area. When the apparatus determines by referring to the flag information that a defective area from which data is requested to be reproduced is not replaced by a replacement area, the apparatus reproduces the data from the defective area. However, when a user requests data to be recorded in a sector, and an ECC block including the sector cannot be read out, this apparatus cannot record the data in a replacement area, either.

SUMMARY OF THE INVENTION

Accordingly, it is a general object of the present invention to provide a defect management method, a reproduction method, a recording medium on which a program is recorded, an information recording apparatus, and an information reproduction apparatus in which the above-described disadvantage is eliminated.

A more specific object of the present invention is to provide a defect management method and a reproduction method enabling highly reliable information reproduction from an information recording medium, recording media on which programs for causing a computer to execute such methods are recorded, and an information recording apparatus and an information reproduction apparatus enabling highly reliable information reproduction from an information recording medium.

The above objects of the present invention are achieved by a method of managing a defective area in an information recording medium having a user data area, a replacement area, and a defect management information area, the method managing the defective area using a block of a predetermined size as a unit of management, the method comprising the step of at a time of replacing a defective block including the defective area with a replacement block of the replacement area, dividing the replacement block into a plurality of sub-blocks, and setting identification information for identifying a first one of the sub-blocks to which data is relocated from the defective block and a second one of the sub-blocks to which no data is relocated from the defective block, the identification information being set in defect management information.

According to this invention, even in the case of performing defect management block by block, it is possible to relocate data from a defective block to a replacement block in the units of areas smaller than the blocks. As a result, it is possible to reproduce information from an information recording medium with high reliability.

The above objects of the present invention are also achieved by a reproduction method for reproducing data from an information recording medium on which defect management is performed according to a defect management method according to the present invention, the reproduction method including the step of determining whether the replacement block is a target of reproduction, referring to the identification information set in the defect management, when a reproduction address resides in the replacement block.

According to this invention, even in the case of relocating data from a defective block to a replacement block in the units of areas smaller than blocks, it is possible to obtain a block in which requested data is stored. As a result, it is possible to reproduce information from an information recording medium with high reliability.

The above objects of the present invention are also achieved by a computer-readable recording medium on which is recorded a program for causing a computer to execute a method of managing a defective area in an information recording medium having a user data area, a replacement area, and a defect management information area, the method managing the defective area using a block of a predetermined size as a unit of management, the method including the step of at a time of replacing a defective block including the defective area with a replacement block of the replacement area, dividing the replacement block into a plurality of sub-blocks, and setting identification information for identifying a first one of the sub-blocks to which data is relocated from the defective block and a second one of the sub-blocks to which no data is relocated from the defective block, the identification information being set in defect management information.

The above objects of the present invention are also achieved by a computer-readable recording medium on which is recorded a program for causing a computer to execute a reproduction method for reproducing data from an information recording medium on which defect management is performed according to a defect management method according to the present invention, the reproduction method including the step of determining whether the replacement block is a target of reproduction, referring to the identification information set in the defect management, when a reproduction address resides in the replacement block.

The above objects of the present invention are also achieved by an apparatus for recording data on an information recording medium where a defective area is managed using a block of a predetermined size as a unit of management, the information recording medium having a user data area, a replacement area, and a defect management information area, the apparatus including a replacement part configured to replace a defective block including the defective area with a replacement block of the replacement area; and an identification information setting part configured to divide the replacement block into a plurality of sub-blocks, and set identification information for identifying a first one of the sub-blocks to which data is relocated from the defective block and a second one of the sub-blocks to which no data is relocated from the defective block, the identification information setting part setting the identification information in defect management information.

According to this invention, even in the case of performing defect management block by block, it is possible to relocate data from a defective block to a replacement block in the units of areas smaller than the blocks. As a result, it is possible to reproduce information from an information recording medium with high reliability.

The above objects of the present invention are also achieved by an apparatus for reproducing data from an information recording medium on which defect management is performed according to a defect management method according to the present invention, the apparatus including a determination part configured to determine whether the replacement block is a target of reproduction, referring to the identification information set in the defect management, when a reproduction address resides in the replacement block; and a processing part configured to perform processing in accordance with a result of the determination in the determination part.

According to this invention, even in the case of relocating data from a defective block to a replacement block in the units of areas smaller than blocks, it is possible to obtain a block in which requested data is stored. As a result, it is possible to reproduce information from an information recording medium with high reliability.

BRIEF DESCRIPTION OF THE DRAWINGS

Other objects, features and advantages of the present invention will become more apparent from the following detailed description when read in conjunction with the accompanying drawings, in which:

FIG. 4A is a diagram and FIG. 4B shows tables for illustrating a replacement list according to the embodiment of the present invention;

FIG. 8A is a diagram and FIG. 8B is a table for illustrating a first variation of the embodiment of the present invention;

FIGS. 10A and 10B are tables for illustrating the second variation of the embodiment of the present invention.

DETAILED DESCRIPTION OF THE PREFERRED EMBODIMENTS

A description is given below, with reference to the accompanying drawings, of an embodiment of the present invention.

Figure 1:
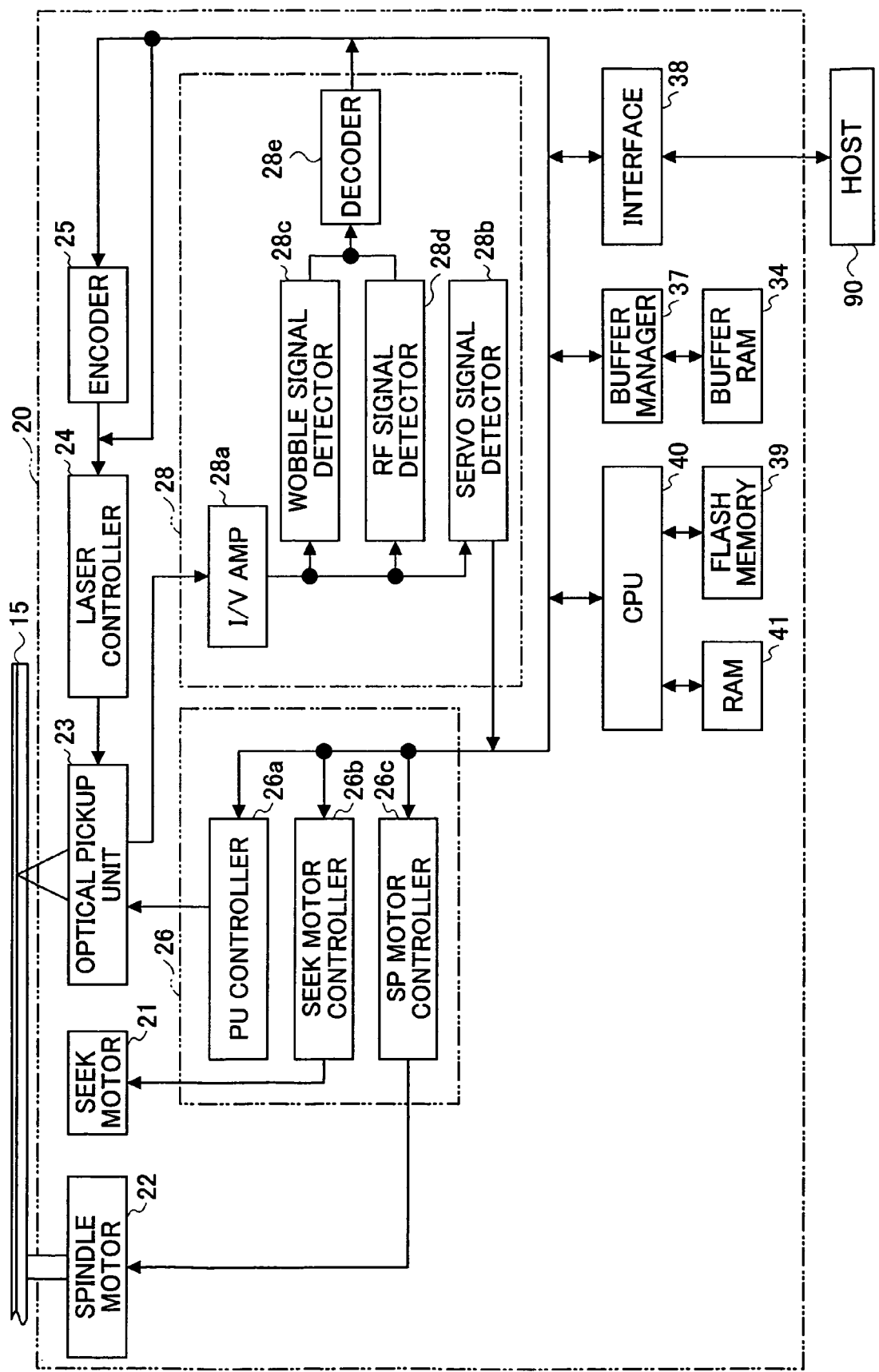
FIG. 1 is a block diagram illustrating an optical disk unit according to an embodiment of the present invention.

FIG. 1 is a block diagram illustrating an optical disk unit 20 serving as an information recording apparatus and an information reproduction apparatus according to the embodiment of the present invention.

The optical disk unit 20 includes a spindle motor 22 for rotating an optical disk 15 as an information recording medium, an optical pickup unit 23, a seek motor 21 for driving the optical pickup unit 23 in the radial directions of the optical disk 15, a laser controller circuit 24, an encoder 25, a servo controller circuit 26, a reproduced signal processor circuit 28, a buffer RAM 34, a buffer manager 37, an interface 38, a flash memory 39, a CPU 40, and a RAM 41. The arrows in FIG. 1 represents typical signal and information flows, and do not represent all the interconnections of the blocks. In this embodiment, it is assumed that a DVD+RW is employed as an example of the optical disk 15.

The optical pickup unit 23 emits laser light onto the recording surface of the optical disk 15 on which recording surface a spiral track or concentric tracks are formed, and receives light reflected from the recording surface. The optical pickup unit 23 includes an optical system, a light receiver, and a drive system (not graphically illustrated). The optical system includes a semiconductor laser and an objective lens. The optical system guides a light beam emitted from the semiconductor laser to the recording surface of the optical disk 15, and guides the light beam reflected back from the recording surface to a predetermined light-receiving position. The light receiver is provided at the light-receiving position to receive the reflected light beam. The drive system includes a focusing actuator and a tracking actuator. The light receiver outputs a signal according to the amount of received light to the reproduced signal processor circuit 28.

The reproduced signal processor circuit 28 includes an I/V amplifier 28a, a servo signal detector circuit 28b, a wobble signal detector circuit 28c, an RF signal detector circuit 28d, and a decoder 28e. The I/V amplifier 28a converts the output signal of the light receiver of the optical pickup unit 23 into a voltage signal, and amplifies the output signal by a predetermined gain. The servo signal detector circuit 28b detects servo signals such as a focus error signal and a tracking error signal based on the output signal of the I/V amplifier 28a. The detected servo signals are output to the servo controller circuit 26. The wobble signal detector circuit 28c detects a wobble signal based on the output signal of the I/V amplifier 28a. The RF signal detector circuit 28d detects an RF signal based on the output signal of the I/V amplifier 28a. The decoder 28e extracts address information and a synchronization signal from the wobble signal. The extracted address information is output to the CPU 40, and the extracted synchronization signal is output to the encoder 25. The decoder 28e performs decoding and error detection on the RF signal. When an error is detected, the decoder 28e performs error correction on the RF signal. Thereafter, the decoder 28e stores the RF signal in the buffer RAM 34 through the buffer manager 37 as reproduced data.

The servo controller circuit 26 includes a PU controller circuit 26a, a seek motor controller circuit 26b, and an SP motor controller circuit 26c. The PU controller circuit 26a generates a drive signal to drive the focusing actuator based on the focus error signal in order to correct the focus error of the objective lens of the optical pickup unit 23. The PU controller circuit 26a also generates a drive signal to drive the tracking actuator based on the tracking error signal in order to correct the tracking error of the objective lens. The generated drive signals are output to the optical pickup unit 23, so that tracking control and focus control are performed. The seek motor controller circuit 26b generates a drive signal to drive the seek motor 21 based on a command from the CPU 40. The generated drive signal is output to the seek motor 21. The SP motor controller circuit 26c generates a drive signal to drive the spindle motor 22 based on a command from the CPU 40. The generated drive signal is output to the spindle motor 22.

Data to be recorded on the optical disk 15 (recording data) and data reproduced from the optical disk 15 (reproduced data) are stored temporarily in the buffer RAM 34. The input of data to and the output of data from the buffer RAM 34 are managed by the buffer manager 37.

Based on a command from the CPU 40, the encoder 25 extracts recording data stored in the buffer RAM 34 through the buffer manager 37, performs modulation on the data, and adds an error correction code to the data, thereby generating a write signal to write the data to the optical disk 15. The generated write signal is output to the laser controller circuit 24.

The laser controller circuit 24 controls the power of a laser beam emitted from the semiconductor laser of the optical pickup unit 23. For instance, in the case of recording, the laser controller circuit 24 generates a drive signal to drive the semiconductor laser based on the write signal, recording conditions, and the light emission characteristics of the semiconductor laser.

The interface 38 is a bidirectional communications interface with a host apparatus 90 such as a personal computer. The interface 38 is based on a standard interface such as ATAPI (AT Attachment Packet Interface), SCSI (Small Computer System Interface), or USB (Universal Serial Bus).

The flash memory 39 includes a program area and a data area. Programs including a program written in a code decodable by the CPU 40 according to the present invention are stored in the program area. Recording conditions and the light emission characteristics of the semiconductor laser are stored in the data area.

The CPU 40 controls the operation of each of the above-described elements in accordance with the programs stored in the program area of the flash memory 39. The CPU 40 stores data necessary for the control in the RAM 41 and the buffer RAM 34.

Figure 2:
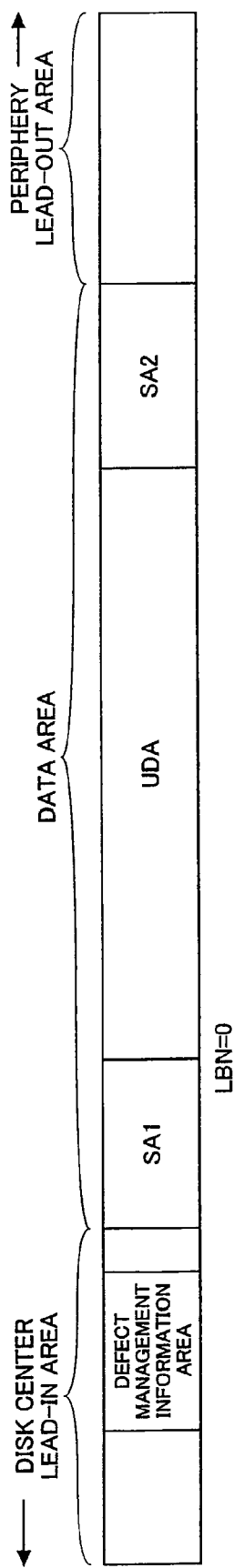
FIG. 2 is a diagram for illustrating a recording area layout in a conventional defect management method.

A description is given, with reference to FIG. 2, of a defect management-related portion of the layout (disk layout) of a recording area according to the conventional management method.

In this conventional case illustrated in FIG. 2, the recording area is divided into a lead-in area, a data area, and a lead-out area from the center to the periphery of the disk.

A defect management information area in which the above-described defect management information is recorded exists in the lead-in area.

Data is recorded in and reproduced from the data area. All the sectors of the data area are preassigned respective absolute addresses called "physical addresses." The data area is divided into first spare (replacement) area (hereinafter, "SA1"), a user data area (hereinafter, "UDA"), and a second spare (replacement) area (hereinafter, "SA2").

The UDA is reserved for storing user data. Each sector included in the UDA is assigned a logical address. A user accesses the optical disk using the logical addresses to record or reproduce data.

When a defect occurs in the UDA, the SA1 or SA2 is used instead of the defective area of the UDA including the defect. The SA1 is disposed inside the UDA so that in the case of the occurrence of a defect in an area storing file management information (including unused-space management information and the file entries of a root directory), the defective part of the area (defective area) can be replaced quickly. The file management information is stored in the vicinity of a sector assigned a logical address "0." Accordingly, the seek distance between the defective area and an area to replace the defective area can be reduced by disposing the SA1 on the center side of the disk. As a result, the replacement of the defective area can be performed at high speed. The SA2 is disposed outside the UDA.

The defect management information area stores a replacement list relating a defect in the UDA and a replacement area used instead of the defective part of the UDA.

Figure 3:
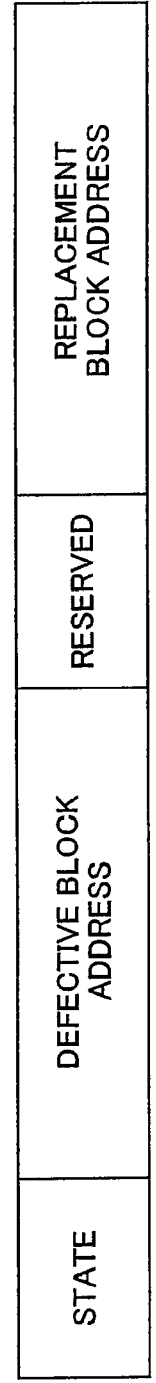
FIG. 3 is a diagram for illustrating a replacement list in the conventional defect management method.

According to this conventional case, defect management is performed using an ECC block as a unit. As illustrated in FIG. 3, the replacement list includes a replacement block address that is information on the address of a replacement block managed by the replacement list, a defective block address that is information on the address of a defective block in the UDA replaced or to be replaced by the replacement block, and state-information describing the state of the replacement list.

The state information includes information as to whether any data of the defective block is relocated to the replacement block (any data of the defective block is recorded in the replacement block instead of the defective block).

Next, a description is given, with reference to FIGS. 4A and 4B, of a replacement list according to this embodiment.

Figure 5A:
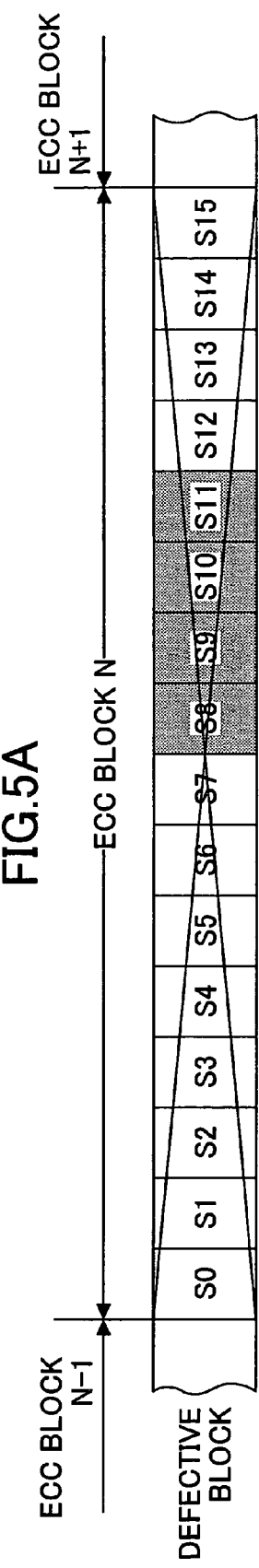
FIGS. 5A through 5C are diagrams for illustrating bit map information in FIG. 4A according to the embodiment of the present invention.
Figure 5B:
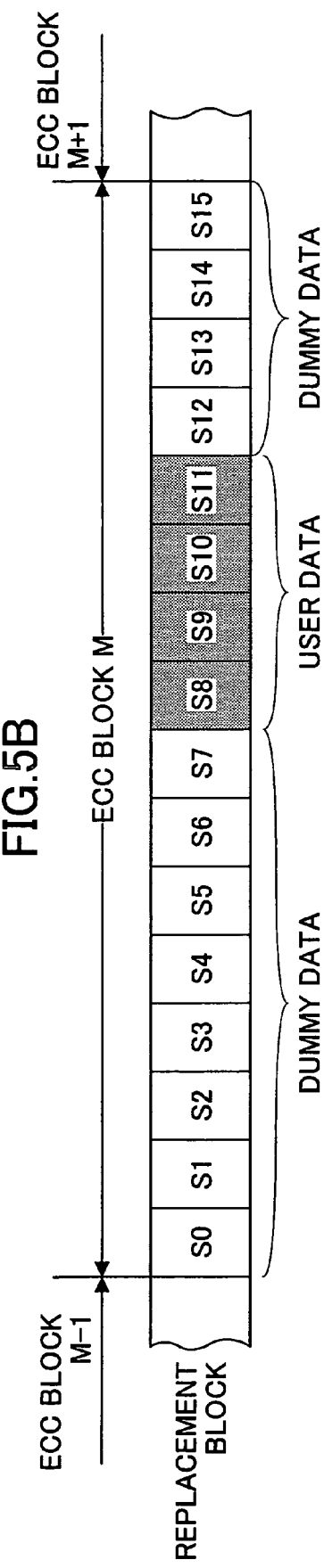
Figure 5C:
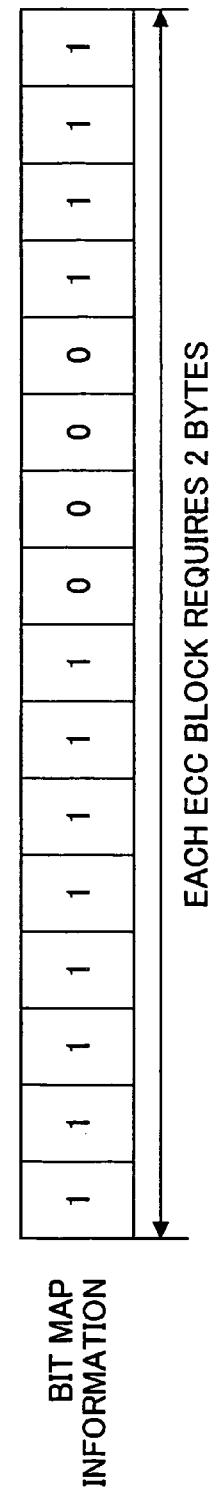

According to the replacement list of this embodiment, as illustrated in FIG. 4A, a bit map area for storing bit map information as identification information is added to the replacement list of the above-described conventional case. As illustrated in FIGS. 5A through 5C as an example, the bits of this bit map information correspond to the respective sectors (sub-blocks) of an ECC block, and it is assumed, for instance, that "0" is set in a bit corresponding to a sector to which data is relocated (a replacement sub-block in use) and "1" is set in a bit corresponding to a sector to which no data is relocated (an unused replacement sub-block). According to this embodiment, the ECC block is composed of 16 sectors, and the bit map area is 2 bytes (16 bits) in size. That is, the bit map information is 2-byte data.

Further, the state information is stored, being divided into a first information item (STATE 1) and a second information item (STATE 2). As illustrated in FIG. 4B, the state information represents the state of the replacement block by the combination of STATE 1 and STATE 2. If STATE 1 is "0000b," the state information indicates that the defective block is assigned to the replacement block and that data is relocated to the replacement block. If STATE 1 is "0001b," the state information indicates that the defective block is assigned to the replacement block and that no data is relocated to the replacement block. If STATE 1 is "0010b," the state information indicates that the replacement list is unused with no defective block being assigned to the replacement block. If STATE 1 is "0011b," the state information indicates that the replacement block is defective. Here, when STATE 1 is "0000b," the state information defines the state of the replacement list in more detail by STATE 2. In this specification, the bits in the state information are referred to as the first through fourth bits from the highest-order bit to the lowest-order bit for convenience of description.

The fourth bit of STATE 2 indicates whether the same data is recorded in the defective block and the replacement block. That is, if the fourth bit is "0" (STATE 2="00x0b"), the same data is recorded in the defective block and the replacement block. If the fourth bit is "1" (STATE 2="00x1b"), the data recorded in the defective block is different from the data recorded in the replacement block. Here, "x" indicates that a value may be either "0" or "1."

The third bit of STATE 2 indicates whether the data of the defective block is partially relocated to (a corresponding part of) the replacement block. That is, if the third bit is "0" (STATE 2="000xb"), the data of all the sectors of the defective block are relocated to the replacement block. If the third bit is "1" (STATE 2="001xb"), the data of the defective block is partially relocated to (a corresponding part of) the replacement block.

Accordingly, the bit map area should be referred to only when STATE 2 is "001xb." When STATE 2 is "000xb," it can be determined without referring to the bit map area that all the sectors of the replacement block retain relocated data. Further, if all the data of the defective block can be relocated to the replacement block at the time of replacing the defective block, setting "000xb" in STATE 2 eliminates the necessity of setting the bit map information. Thus, defect management is facilitated by setting information as to whether data is relocated to a part of the replacement block in the state information.

Accordingly, information forming below-described defect management basic information and replacement list tables is included in the defect management information.

[Recording Operation]

Figure 6:
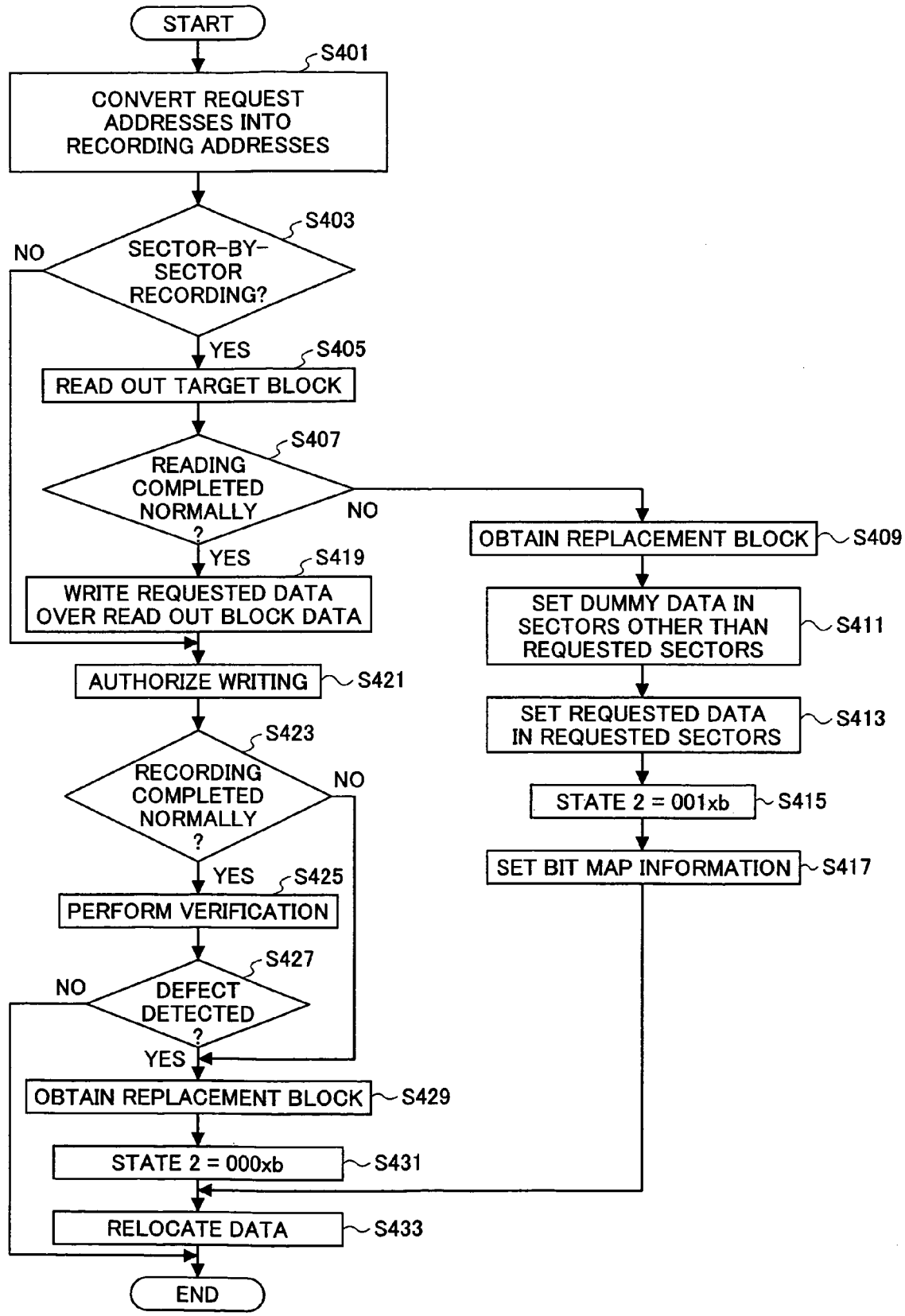
FIG. 6 is a flowchart for illustrating a recording operation using the optical disk unit of FIG. 1 according to the embodiment of the present invention.

Next, a description is given, with reference to FIG. 6, of an operation performed when the optical disk unit 20 having the above-described configuration receives a command (request) for recording (a recording command) from the host apparatus 90. The flowchart of FIG. 6 corresponds to the flow of a processing algorithm executed by the CPU 40. Here, it is assumed that recording on Sector 8 (S8) through Sector 11 (S11) in the ECC block N of FIG. 5A is requested.

When the recording command is received from the host apparatus 90, the starting address of a program corresponding to the flowchart of FIG. 6 (hereinafter, referred to as "recording operation program") is set in the program counter of the CPU 40, and a recording operation is started.

First, in step S401 of FIG. 6, referring to the defect management information, the request addresses specified in logical addresses by a user are converted into recording addresses. Here, the request addresses are converted into physical addresses. If the physical addresses are not entered in a replacement list, the physical addresses directly serve as the recording addresses. If the physical addresses are entered in a replacement list, the corresponding addresses of the replacement block serve as the recording addresses.

Next, in step S403, it is determined based on the recording command whether the recording requested by the user is sector-by-sector recording. In this case, the user requests recording in the units of sectors. Accordingly, an affirmative determination is made in step S403 (YES in step S403) and step S405 is entered.

In step S405, an instruction to read out an ECC block in which the recording addresses reside (hereinafter, also referred to as "target block") is given. In this case, an instruction to read out S0 through S15 of the ECC block N is given.

In step S407, it is determined whether the readout of the target block is completed normally. If the readout is not completed normally (NO in step S407), step S409 is entered. That is, the target block is defective.

In step S409, referring to the defect management information, a replacement block to be used to replace the defective target block is obtained from an unused replacement list (a replacement list in which STATE 1 is "0010b"). Here, it is assumed that the ECC block M of FIG. 5B is obtained as the replacement block.

Next, in step S411, dummy data is set in a part of writing data (data to be written) which part corresponds to the sectors other than the requested sectors, that is, the sectors on which recording is requested. Here, as illustrated in FIG. 5B, the dummy data is set in the part of the writing data corresponding to S0 through S7 and S12 through S15.

Next, in step S413, data that the user requests to be recorded (requested data) is set in the part of the writing data corresponding to the requested sectors. Here, as illustrated in FIG. 5B, the requested data is set in S8 through S11. As a result, the writing data is generated.

Next, in step S415, information indicating that all the sectors of the replacement block do not retain relocated data (the data of the defective target block is partially relocated to the replacement block) is set in the state information of the replacement list corresponding to the replacement block. Here, "001xb" is set in STATE 2.

Next, in step S417, information for identifying a sector to which data is relocated and a sector to which no data is relocated in the replacement block is set in the bit map information of the replacement list corresponding to the replacement block. Here, as illustrated in FIG. 5C, "1" is set in each of the bits corresponding to S0 through S7 and S12 through S15, and "0" is set in each of the bits corresponding to S8 through S11. Then, step S433 is entered.

In step S433, an instruction to record the writing data in the replacement block (in this case, the ECC block M) is given. As a result, the writing data is recorded in the replacement block (ECC block M) through the encoder 25, the laser controller circuit 24, and the optical pickup unit 23. At this point, the updated defect management information is also recorded on the optical disk 15. Thereby, the recording operation ends.

On the other hand, if the readout is completed normally in step S407 (YES in step S407), step S419 is entered.

In step S419, the requested data overwrites data read out from the target block, thereby generating the writing data. Here, the requested data is set in the part of the writing data corresponding to S8 through S11.

In step S421, writing of the writing data is authorized. As a result, the writing data is recorded in the ECC block N through the encoder 25, the laser controller circuit 24, and the optical pickup unit 23.

In step S423, it is determined whether the recording of the writing data is completed normally. If the recording of the writing data is completed normally (YES in step S423), step S425 is entered.

In step S425, verification is performed on the block (ECC block N) in which the writing data is recorded.

Next, in step S427, it is determined based on the result of the verification whether the block in which the writing data is recorded includes a defect. For instance, if the error rate is higher than or equal to a predetermined value in the block in which the writing data is recorded, an affirmative determination is made in this step (that is, YES in step S427), and step S429 is entered.

In step S429, a replacement block to be used to replace the defective block is obtained in the same manner as in step S409.

Next, in step S431, since the data of all the sectors of the defective block (ECC block N) are retained, information indicating that all the sectors of the replacement block retain relocated data is set in the state information of the replacement list corresponding to the replacement block. Here, "000xb" is set in STATE 2. Then, step S433 is entered. In this case, the value of STATE 2 shows that the data relocated to the replacement block is not partial. Accordingly, no settings of the bit map information are provided.

If no defect is detected in step S427 (NO in step S427), the recording operation ends.

If the recording of the writing data is not completed normally in step S423 (NO in step S423), step S429 is entered. That is, the verification of step S425 is skipped, and the recording in the replacement block is performed.

Further, if the user requests recording in the units of ECC blocks in step S403 (NO in step S403), step S421 is entered. That is, the RMW (read-modify-write) operation is skipped.

[Reproduction Operation]

Figure 7:
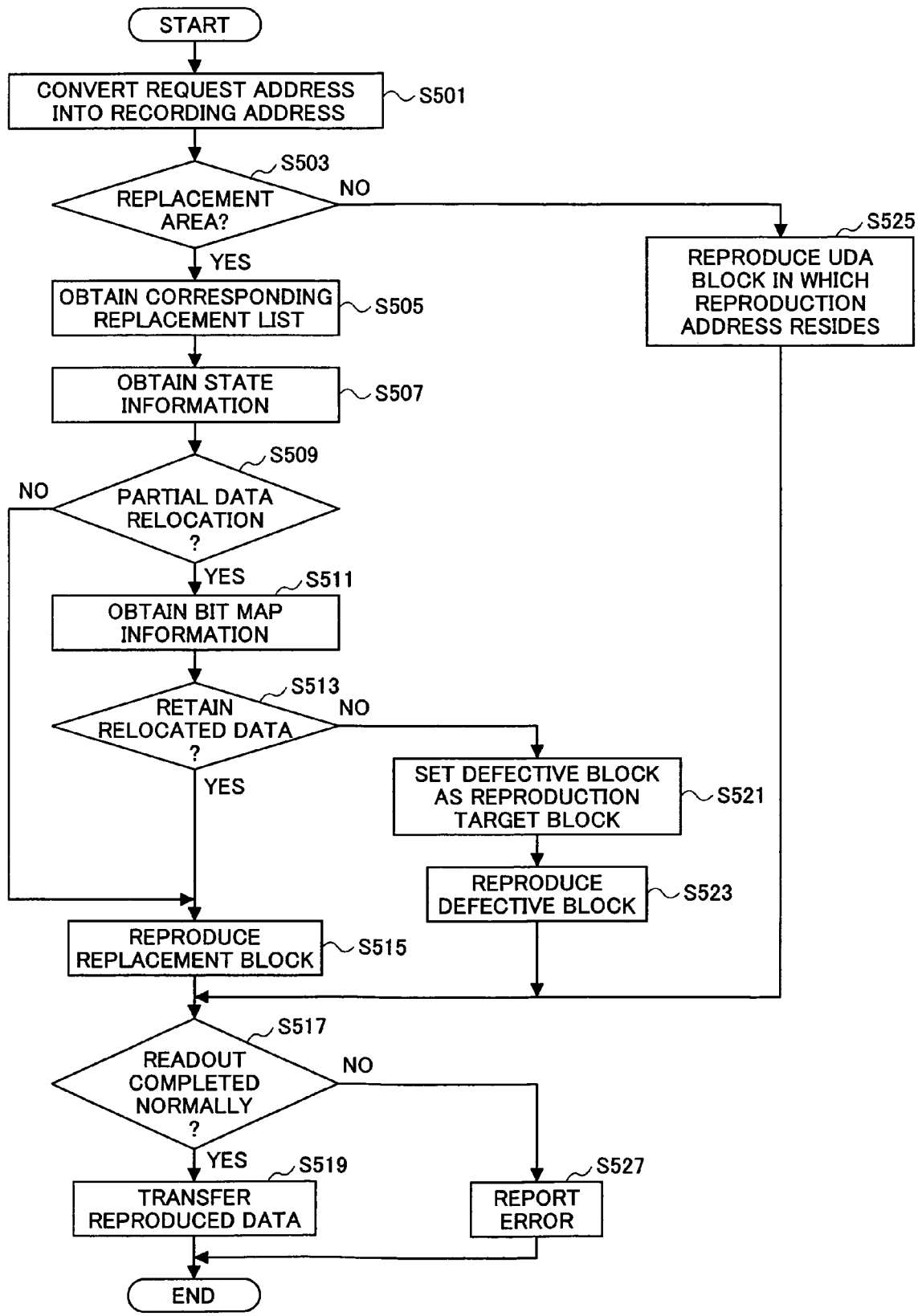
FIG. 7 is a flowchart for illustrating a reproduction operation using the optical disk unit of FIG. 1 according to the embodiment of the present invention.

Next, a description is given, with reference to FIG. 7, of an operation performed when the optical disk unit 20 receives a command (request) for reproduction (a reproduction command) from the host apparatus 90. The flowchart of FIG. 7 corresponds to the flow of a processing algorithm executed by the CPU 40. Here, as in the above-described recording operation, it is assumed as an example that a user requests reproduction in the units of sectors.

When the reproduction command is received from the host apparatus 90, the starting address of a program corresponding to the flowchart of FIG. 7 (hereinafter, referred to as "reproduction operation program") is set in the program counter of the CPU 40, and a reproduction operation is started.

First, in step S501 of FIG. 7, referring to the defect management information, the request address specified in a logical address by the user is converted into a reproduction address. Here, the request address is converted into a physical address. If the physical address is not entered in a replacement list, or if the physical address is entered in a replacement list but is an area whose data is not recorded in a replacement block (STATE 1="0001b"), the physical address directly serves as the reproduction address. On the other hand, if the physical address is entered in a replacement list and is an area whose data is recorded in a replacement block (STATE 1="0000b"), the corresponding address of the replacement block serves as the reproduction address.

Next, in step S503, it is determined whether the reproduction address is included in a replacement area. If the reproduction address is included in a replacement area (YES in step S503), step S505 is entered.

In step S505, the replacement list corresponding to the replacement block in which the reproduction address resides is obtained. This replacement list is also referred to as "corresponding replacement list."

Next, in step S507, state information is obtained from the corresponding replacement list.

Next in step S509, it is determined whether the data of a defective block is partially relocated to a part of the replacement block. Here, if STATE 2 is "001xb," the data of the defective block is partially relocated to a part of the replacement block. Accordingly, in this case, an affirmative determination is made in step S509 (that is, YES in step S509), and step S511 is entered.

In step S511, bit map information is obtained from the corresponding replacement list.

Next, in step S513, it is determined referring to the bit map information whether a sector indicated by the reproduction address retains relocated data. If the flag corresponding to the sector indicated by the reproduction address is "0" (YES in step S513), step S515 is entered.

In step S515, an instruction to reproduce the corresponding data from the block (replacement block) in which the reproduction address resides is given.

Next, in step S517, it is determined whether the readout (reproduction) is completed normally. If the readout is completed normally (YES in step S517), step S519 is entered.

In step S519, the transfer of the reproduced data is authorized. The reproduced data stored in the buffer RAM 34 through the reproduced signal processor circuit 28 as described above is transferred to the host apparatus 90 in the units of sectors (sector by sector). Thereby, the reproduction operation ends.

If the readout is not completed normally in step S517 (NO in step S517), step S527 is entered. In step S527, error is reported. Then, the reproduction operation ends.

If the flag corresponding to the sector indicated by the reproduction address is "1" in step S513 (that is, NO in step S513), step S521 is entered. In this case, dummy data is recorded in the sector indicated by the reproduction address. Therefore, referring to the corresponding replacement list, the defective block corresponding to the replacement block, that is, the original block, is determined as a target of reproduction (a reproduction target block). Next, in step S523, an instruction to reproduce the corresponding data from the original block is given. Then, step S517 is entered.

If STATE 2 is "000xb" in step S509, the data of all the sectors of the defective block are relocated to the replacement block. Accordingly, a negative determination is made in step S509 (that is, NO in step S509), and step S515 is entered. That is, the replacement block is determined as a target of reproduction (a reproduction target block).

If the reproduction address is not included in a replacement area in step S503 (NO in step S503), step S525 is entered. In step S525, an instruction to reproduce the corresponding data from a block in which the reproduction address resides (a block in the UDA) is given. Then, step S517 is entered.

As clarified in the above description, in the optical disk unit 20 according to this embodiment, the encoder 25, the laser controller circuit 24, the optical pickup unit 23, the CPU 40, and the program executed by the CPU 40 form a replacement part. Further, the CPU 40 and the program executed by the CPU 40 realize an identification information setting part, an information storage part, and a determination part. Further, the reproduction signal processor circuit 28, the CPU 40, and the program executed by the CPU 40 form a processing part (device). At least a portion or all of the parts realized by processing according to the program by the CPU 40 may be configured by hardware.

According to this embodiment, the program of the present invention is made up of the recording operation program and the reproduction operation program of the programs stored in the flash memory 39.

A defect management method according to the present invention is implemented in the above-described recording operation. A reproduction method according to the present invention is implemented in the above-described reproduction operation.

As described above, according to the optical disk unit 20 according to this embodiment, the UDA (user data area) of the optical disk (information recording medium) 15 is divided into ECC blocks (blocks of a predetermined size), and defect management is performed in the units of ECC blocks. At the time of replacing a defective block including a defective area with a replacement block in a replacement area, the replacement block is divided into sectors (sub-blocks), and bit map information (identification information) for identifying a sector to which data is relocated (replacement sub-blocks in use) and a sector to which no data is relocated (unused replacement sub-blocks) is set in the defective management information. As a result, it is possible to record data in a replacement block in the units of sectors in an optical disk in which defect management is performed in the units of ECC blocks. That is, even in an information recording medium in which defect management is performed in the units of ECC blocks, it is possible to record data in a replacement area in smaller units than the ECC blocks. Further, even if an error occurs in reading out an ECC block in response to a request to record data (user data) in the units of sectors from a user, it is possible to record the user data in a replacement block or area. Accordingly, as a result, it is possible to reproduce information from the information recording medium with high reliability. The sectors are minimum units of access requestable by a user.

Further, information as to whether the data in the replacement block is partial is set in the state information. Therefore, at the time of reproducing the replacement block, it is possible to determine from the state information of a replacement list corresponding to the replacement block whether all the sectors of the replacement block retain the data relocated from the defective block or a part of the replacement block retains the corresponding data relocated from the defective block. Only when a part of the replacement block retains the corresponding data relocated from the defective block, it is determined with respect to each requested sector whether the sector retains the corresponding relocated data, referring to the bit map information. As a result, a block in which the requested data is stored can be obtained with efficiency.

Further, the bit map information is employed as identification information with a one-bit flag set for each sector of the replacement block, indicating whether the sector retains relocated data. Accordingly, it is possible to reduce the size of the defect management information compared with the case of retaining a replacement list for each sector.

Further, the bit map information is added to a replacement list so as to be stored in the replacement table storage area (defect management information area) with respect to each replacement block. Accordingly, it is possible to determine with efficiency whether a sector (requested sector) from which the user requests data to be reproduced retains relocated data.

If a reproduction address is included in a replacement area, it is determined referring to the bit map information whether a sector indicated by the reproduction address retains relocated data. If the sector does not retain relocated data, the original block is subjected to reproduction. This makes it possible to prevent a sector in which dummy data is recorded from being read out from a replacement block to part of which data is relocated, thus preventing wrong data from being transferred to a user.

Further, since the defect management information is recorded on the optical disk, the same recording and reproduction operations may be performed in other optical disk units. That is, it is possible to ensure compatibility.

For instance, if an ECC block in which data is requested to be recorded by a user cannot be read out in the RMW operation, and only the requested data is relocated to a replacement block, the replacement block includes sectors to which the data is relocated (recording sectors in which the user requests the data to be recorded) and the other sectors to which no data can be relocated (the other sectors than the recording sectors). However, reference to the bit map information makes it possible to determine with respect to each sector whether the sector retains the relocated data. Accordingly, when the user requests data to be reproduced from a replacement block to part of which data is relocated, by referring to the bit map information, the data can be reproduced from the replacement block if the data is relocated to the requested sector, or the data can be reproduced from the original block if the data is not relocated to the requested sector. That is, it is possible to prevent wrong data (dummy data) from being transferred in response to a request to reproduce data from a sector in which the dummy data is recorded because of impossibility of data relocation.

In this embodiment, in the case of "NO" in step S513 of the reproduction operation of FIG. 7, the block (original block) corresponding to the replacement block is reproduced. However, it is highly probable that this reproduction may result in a readout error since the original block is defective. Therefore, when a negative determination is made in step S513, error may be reported immediately without reproducing the original block.

Further, in this embodiment, the program according to the present invention is recorded in the flash memory 39. Alternatively, the program may be recorded in another recording medium such as a CD, magneto-optical disk, DVD, memory card, USB memory, or flexible disk. In this case, the program according to the present invention is loaded into the flash memory 39 through a reproduction unit (or a dedicated interface) corresponding to the recording medium. Further, the program according to the present invention may also be transferred to the flash memory 39 via a network such as a LAN, an intranet, or the Internet. That is, the program according to the present invention should be stored in the flash memory 39.

In this embodiment, the optical pickup unit 23 has a single semiconductor laser. Alternatively, the optical pickup unit 23 may have multiple semiconductor lasers emitting light beams of wavelengths different from each other. In this case, the optical pickup unit 23 may include at least one of a semiconductor laser emitting a light beam of a wavelength of approximately 405 nm, a semiconductor laser emitting a light beam of a wavelength of approximately 660 nm, and a semiconductor laser emitting a light beam of a wavelength of approximately 780 nm. That is, the optical disk unit 20 may support multiple types of optical disks based on standards different from each other. In this case, the above-described defect management may be performed on at least one of the multiple types of optical disks.

[First Variation]

A description is given, with reference to FIGS. 8A and 8B, of a first variation of the above-described embodiment. In the first variation, as illustrated in FIG. 8A, a dedicated area for storing the bit map information in the above-described embodiment is reserved in the defect management information area of the lead-in area. The defect management information area according to the first variation includes a defect management basic information storage area, multiple replacement table groups, and a bit map area. The defect management basic information storage area stores defect management basic information that is basic information on defect management. A description is given below of a data structure of the defect management basic information. Each of the replacement table groups is an area for storing multiple replacement lists. Each replacement table group is formed of a predetermined block. The number of replacement table groups varies depending on the number of replacement lists. In this variation, it is assumed that two replacement table groups RTG0 and RTG1 exist. The bit map area stores bit map information corresponding to all sectors included in a replacement area.

The replacement table groups and the bit map area use the area immediately inside the defect management basic information storage area in the defect management information area sequentially toward the disk center. If a defect occurs in any of the replacement table groups and the bit map area, the defective replacement table or bit map area is replaced by the area immediately inside the bit map area. For instance, in the case of FIG. 8A, a defect occurs in the replacement table group RTG1, so that the defective replacement table group RTG1 is replaced by the area immediately inside the bit map area.

FIG. 8B illustrates part of the defect management basic information. Referring to FIG. 8B, the defect management basic information includes information items such as Identification ID, Version Number, Update Count, SA1 Size, SA2 Size, Number of Replacement Table Groups, Position Information of Replacement Table RTG0 (RTG0 Position Information), Position Information of Replacement Table RTG1 (RTG1 Position Information), Position Information of Bit Map Area (Bit Map Area Position Information), SA2 Byte Offset Information, and Bit Map Size. Identification ID stores ID information indicating that the information is defect management basic information. Version Number stores the version number of the defect management basic information. Update Count stores the number of times the defect management basic information is updated (recorded). SA1 Size stores the size of the spare area SA1. SA2 Size stores the size of the spare area SA2. Number of Replacement Table Groups stores the number of replacement table groups existing on the disk. RTG0 Position Information stores information on the area in which the replacement table group RTG0 is recorded. RTG1 Position Information stores information on the area in which the replacement table group RTG1 is recorded. Bit Map Area Position Information stores the address information of the bit map area. SA2 Byte Offset Information stores offset information in the bit map area in which a bit corresponding to the first sector of the SA2 is stored. The offset is represented by the number of bytes from the start of the bit map area. Bit Map Size stores the size (number of bytes) of a valid bit map in the bit map area.

As described above, according to the first variation, the bit map information is stored collectively in a dedicated area. As a result, the bit map information can be retrieved with relative ease. Accordingly, as a result, it is possible to reproduce information from an information recording medium with high reliability as in the above-described embodiment.

Further, according to the first variation, information on the storage area of the bit map information is stored in the defect management basic information area (a predetermined area). Accordingly, at the time of obtaining the defect management basic information, it is possible to obtain the bit map information subsequently thereto.

[Second Variation]

A description is given, with reference to FIGS. 9A through 10B, of a second variation according to the above-described embodiment.

Figure 9A:
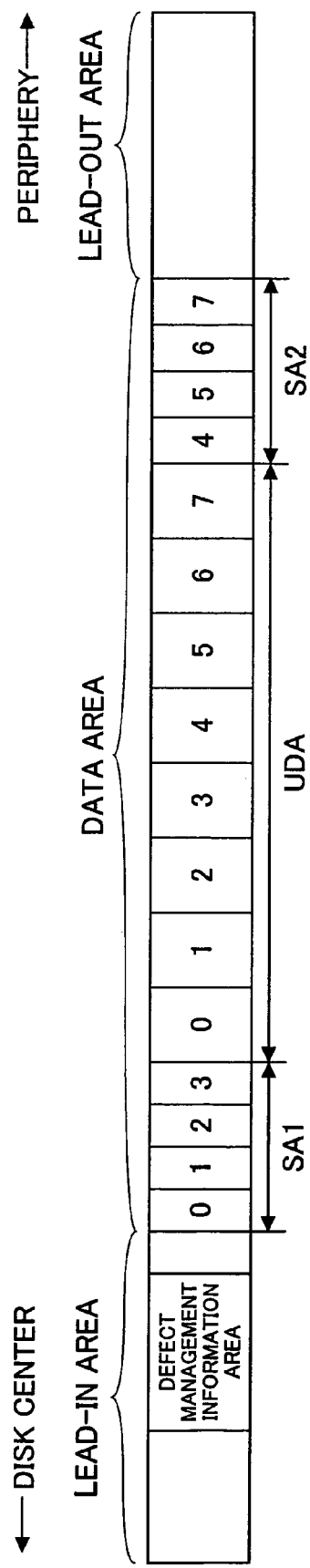
FIGS. 9A through 9C are diagrams for illustrating a second variation of the embodiment of the present invention.
Figure 9B:
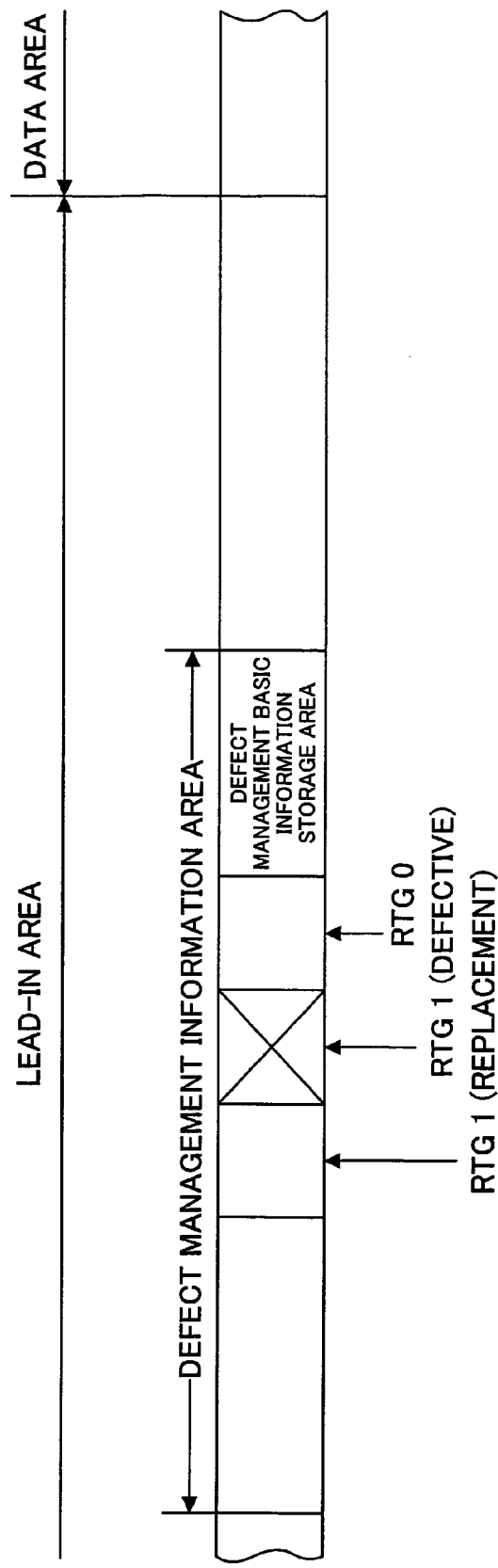
Figure 9C:
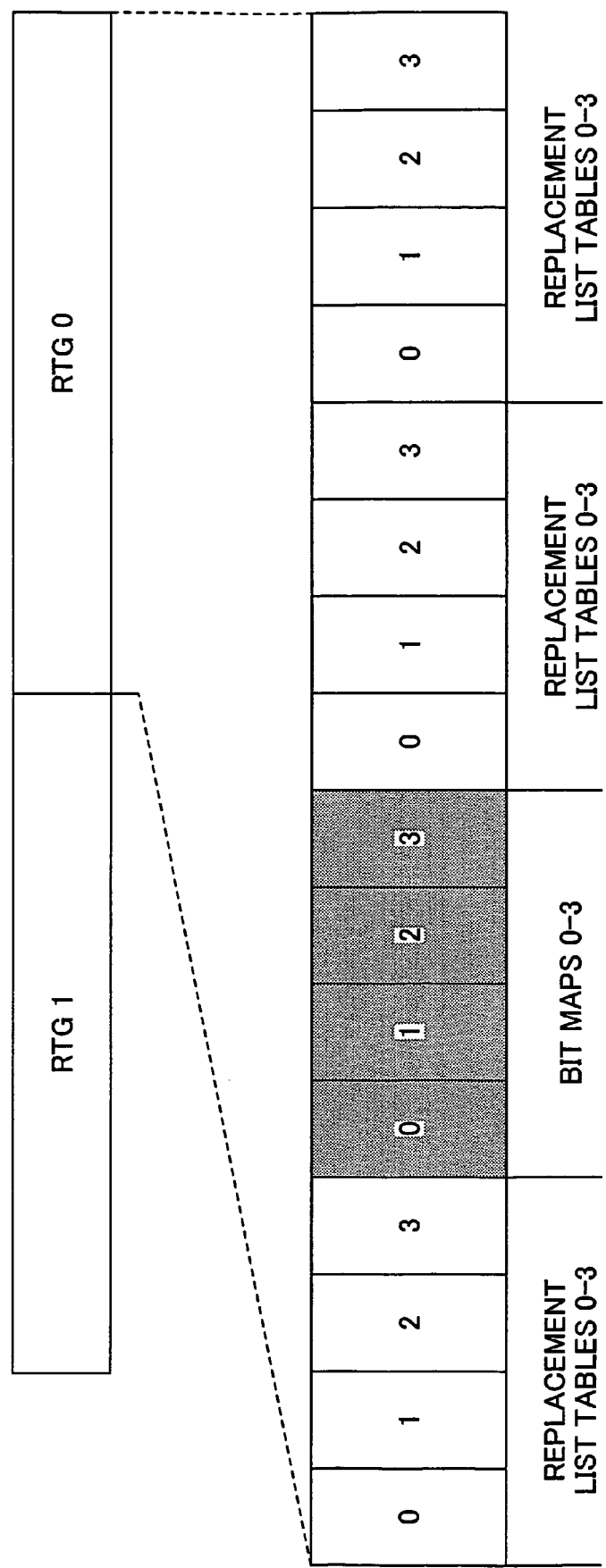

According to the second variation, as illustrated in FIG. 9A as an example, each of the user data area UDA and the spare area (SA1 and SA2) is divided physically (or virtually) into eight partial areas, and defect management is performed partial area by partial area. Here, each partial area is made up of corresponding partial UDA and SA. As illustrated in FIG. 9B, the defect management information area according to the second embodiment includes a defect management basic information storage area and multiple replacement table groups. FIG. 9C illustrates a replacement table group structure. Each replacement table group includes multiple replacement list tables and multiple bit maps. In the second variation, the UDA is divided into eight partial areas as described above, and information on each partial area is stored in a corresponding replacement list table. A description is given below of a data structure of the replacement list table. Each replacement table group is formed of a predetermined block, and stores four replacement list tables. Further, the information of the replacement list tables is stored repeatedly in the corresponding replacement table group. In the second embodiment, two replacement table groups RTG0 and RTG1 exist. The replacement table groups store corresponding bit map information for each partial area (partial SA).

FIG. 10A illustrates part of the defect management basic information according to the second variation. Referring to FIG. 10A, the defect management basic information includes information items such as Identification ID, Version Number, Update Count, SA1 Size, Partial UDA Size, SA2 Size, Number of Replacement Table Groups, Position Information of Replacement Table RTG0 (RTG0 Position Information), and Position Information of Replacement Table RTG1 (RTG1 Position Information). Identification ID stores ID information indicating that the information is defect management basic information. Version Number stores the version number of the defect management basic information. Update Count stores the number of times the defect management basic information is updated (recorded). SA1 Size stores the size of the spare area SA1. Partial UDA Size stores the size of each of the partial areas (partial UDAs) into which the UDA is divided physically (or virtually). SA2 Size stores the size of the spare area SA2. Number of Replacement Table Groups stores the number of replacement table groups existing on the disk. RTG0 Position Information stores information on the area in which the replacement table group RTG0 is recorded. RTG1 Position Information stores information on the area in which the replacement table group RTG1 is recorded.

FIG. 10B illustrates part of the replacement list table. The replacement list table includes information items such as Identification ID, Replacement List Table Number, Update Count, Number of Replacement Lists, Storage Pointer of Unused Replacement List, Storage Pointer of Defective Replacement List, Defective Block Address 1, Defective Block Address 2, Unused Replacement Block Address 1, Unused Replacement Block Address 2, Bit Map Position Information, Bit Map Size, Bit Map Block Address, and Replacement Lists 1 through n.

Identification ID stores ID information indicating that the information is a replacement list table. Replacement List Table Number stores the number of the replacement list table.

A corresponding partial area can be specified from the number of the replacement list table. Update Count stores the number of times the replacement list table is updated (recorded). Number of Replacement Lists stores the number of replacement lists stored in the replacement list table. In this case, it is assumed that n replacement lists are stored in the replacement list table. Storage Pointer of Unused Replacement List stores, in the form of the number of bytes from the start of the replacement list table, information on a position in which the first one of the unused replacement lists (replacement lists not used for data relocation) stored in the replacement list table is stored. Storage Pointer of Defective Replacement List stores, in the form of the number of bytes from the start of the replacement list table, information on a position in which the first one of the defective replacement lists stored in the replacement list table is stored. Defective Block Address 1 stores the address information of one of defective blocks managed in the replacement list table which one has the lowest address. Defective Block Address 2 stores the address information of one of defective blocks managed in the replacement list table which one has the highest address. Unused Replacement Block Address 1 stores the address information of one of the unused replacement blocks (those not used for data relocation of the ECC blocks in the spare [replacement] area) managed in the replacement list table which one has the lowest address. Unused Replacement Block Address 2 stores the address information of one of the unused replacement blocks managed in the replacement list table which one has the highest address. Bit Map Position Information stores the address information of an area in which the bit map information managed by the replacement list table is recorded. Bit Map Size stores the size (number of bytes) of a valid bit map in the bit map area. Bit Map Block Address stores the start address of a replacement area corresponding to a partial area managed in the bit map area.

As described above, according to the second embodiment, the bit map information is stored partial area by partial area. Accordingly, in the case where the spare (replacement) area is divided physically or virtually into multiple partial areas, and defect management is performed partial area by partial area, the bit map information can be retrieved with relative ease. Accordingly, as a result, it is possible to reproduce information from an information recording medium with high reliability as in the above-described embodiment.

Further, according to the second variation, each replacement list table (a predetermined area) stores information on the storage area of the bit map information. Accordingly, at the time of obtaining a replacement list, the corresponding bit map information can be obtained easily.

In the above-described embodiment and variations, the bit map information is employed as identification information. However, the identification information is not limited to the bit map information. Further, a flag is formed of one bit. However, the present invention is not limited to this configuration.

Further, in the above-described embodiment and variations, a DVD+RW is employed as the optical disk 15. Alternatively, according to the present invention, an information recording medium such as a DVD, a CD, or a next-generation information recording medium supporting light of a wavelength of approximately 405 nm may be employed. In this case, an optical disk unit corresponding to the type of the information recording medium is employed as the optical disk unit 20.

Further, in the above-described embodiment and variations, the optical disk 15 is employed as an information recording medium. However, the present invention is also applicable to an information recording medium different in type from the optical disk. In this case, an information recording apparatus and an information reproduction apparatus supporting the information recording medium are employed instead of the optical disk unit 20.

The present invention is not limited to the specifically disclosed embodiment, and variations and modifications may be made without departing from the scope of the present invention.

The present application is based on Japanese Priority Patent Applications No. 2004-068427, filed on Mar. 11, 2004, and No. 2004-110692, filed on Apr. 5, 2004, the entire contents of which are hereby incorporated by reference.

What is claimed is:

1. A method of managing a defective area in an information recording medium having a user data area, a replacement area, and a defect management information area, the method managing the defective area using a block of a predetermined size as a unit of management, the method comprising the step of:
  (a) at a time of replacing a defective block including the defective area with a replacement block of the replacement area, dividing the replacement block into a plurality of sub-blocks, and setting identification information for identifying a first one of the sub-blocks to which data is relocated from the defective block and a second one of the sub-blocks to which no data is relocated from the defective block, the identification information being set in defect management information.

2. The method as claimed in claim 1, further comprising the step of:
  (b) storing the identification information in the information recording medium.

3. The method as claimed in claim 2, wherein said step (b) stores the identification information in the defect management information area.

4. The method as claimed in claim 3, wherein: the replacement block is divided physically or virtually into a plurality of partial areas, and is managed partial area by partial area; and said step (b) divides the identification information in correspondence to the partial areas, and stores the divided identification information in the defect management information area.

5. The method as claimed in claim 3, wherein said step (b) stores the identification information in the defect management information area block by block.

6. The method as claimed in claim 2, wherein said step (b) stores the identification information in a dedicated area reserved therefor.

7. The method as claimed in claim 2, further comprising the step of:
  (c) storing, in the information recording medium, information on an area in which the identification information is stored.

8. The method as claimed in claim 1, further comprising the step of:
  (b) storing, in the information recording medium, information as to whether data of the defective block is partially relocated to a part of the replacement block.

9. The method as claimed in claim 8, wherein said step (a) sets the identification information when the data of the defective block is partially relocated to the part of the replacement block.

10. A method as claimed in claim 1, further including a reproduction method comprising the step of: determining whether the replacement block is a target of reproduction, referring to the identification information set in the defect management, when a reproduction address resides in the replacement block.

11. The method as claimed in claim 10, wherein when the reproduction address indicates the second one of the sub-blocks of the replacement block, said step of determining determines that the replacement block is not the target of reproduction, and determines the defective block corresponding to the replacement block as the target of reproduction.

12. The method as claimed in claim 10, wherein when the reproduction address indicates the second one of the sub-blocks of the replacement block, said step of determining determines that the replacement block is not the target of reproduction, and reports error information.

13. A computer-readable recording medium on which is recorded a program for causing a computer to execute a method of managing a defective area in an information recording medium having a user data area, a replacement area, and a defect management information area, the method managing the defective area using a block of a predetermined size as a unit of management, the method comprising the step of:
  (a) at a time of replacing a defective block including the defective area with a replacement block of the replacement area, dividing the replacement block into a plurality of sub-blocks, and setting identification information for identifying a first one of the sub-blocks to which data is relocated from the defective block and a second one of the sub-blocks to which no data is relocated from the defective block, the identification information being set in defect management information.

14. The computer-readable recording medium as claimed in claim 13, wherein the method further comprises the step of:
  (b) storing the identification information in the information recording medium.

15. The computer-readable recording medium as claimed in claim 14, further comprising the step of: (c) storing, in the information recording medium, information on an area in which the identification information is stored.

16. The computer-readable recording medium as claimed in claim 13, further comprising the step of: (b) storing, in the information recording medium, information as to whether data of the defective block is partially relocated to a part of the replacement block.

17. A computer-readable recording medium as claimed in claim 13, on which is further recorded a program for causing a computer to execute a reproduction method for reproducing data from an information recording medium, the reproduction method comprising the step of: determining whether the replacement block is a target of reproduction, referring to the identification information set in the defect management, when a reproduction address resides in the replacement block.

18. An apparatus for recording data on an information recording medium where a defective area is managed using a block of a predetermined size as a unit of management, the information recording medium having a user data area, a replacement area, and a defect management information area, the apparatus comprising:
  a replacement part configured to replace a defective block including the defective area with a replacement block of the replacement area; and
  an identification information setting part configured to divide the replacement block into a plurality of sub-blocks, and set identification information for identifying a first one of the sub-blocks to which data is relocated from the defective block and a second one of the sub-blocks to which no data is relocated from the defective block, the identification information setting part setting the identification information in defect management information.

19. The apparatus as claimed in claim 18, wherein each of the sub-blocks is equal in size to a minimum unit of access requestable by a user.

20. The apparatus as claimed in claim 18, wherein the identification information includes a plurality of flags, the flags corresponding to the respective sub-blocks.

21. The apparatus as claimed in claim 20, wherein each of the flags is formed of one bit.

22. The apparatus as claimed in claim 18, further comprising: an information storage part configured to store the identification information in the information recording medium.

23. The apparatus as claimed in claim 22, wherein the information storage part stores the identification information in the defect management information area.

24. The apparatus as claimed in claim 23, wherein: the replacement block is divided physically or virtually into a plurality of partial areas, and is managed partial area by partial area; and the information storage part divides the identification information in correspondence to the partial areas, and stores the divided identification information in the defect management information area.

25. The apparatus as claimed in claim 23, wherein the information storage part stores the identification information in the defect management information area block by block.

26. The apparatus as claimed in claim 22, wherein the information storage part stores the identification information in a dedicated area reserved therefor.

27. The apparatus as claimed in claim 22, wherein the information storage part stores, in the information recording medium, information on an area in which the identification information is stored.

28. The apparatus as claimed in claim 22, wherein the information storage part stores, in the information recording medium, information as to whether data of the defective block is partially relocated to a part of the replacement block.

29. The apparatus as claimed in claim 28, wherein the identification information setting part sets the identification information when the data of the defective block is partially relocated to the part of the replacement block.

30. An apparatus as claimed in claim 18, further including apparatus for reproducing data from an information recording medium the apparatus further comprising: a determination part configured to determine whether the replacement block is a target of reproduction, referring to the identification information set in the defect management, when a reproduction address resides in the replacement block; and a processing part configured to perform processing in accordance with a result of the determination in the determination part.

31. The apparatus as claimed in claim 30, wherein when the reproduction address indicates the second one of the sub-blocks of the replacement block, the determination part determines that the replacement block is not the target of reproduction, and determines the defective block corresponding to the replacement block as the target of reproduction.

32. The apparatus as claimed in claim 30, wherein when the reproduction address indicates the second one of the sub-blocks of the replacement block, the determination part determines that the replacement block is not the target of reproduction, and reports error information.

* * * * *

UNITED STATES PATENT AND TRADEMARK OFFICE
CERTIFICATE OF CORRECTION

PATENT NO. : 7,596,063 B2 Page 1 of 1
APPLICATION NO. : 11/074866
DATED : September 29, 2009
INVENTOR(S) : Yoshiyuki Sasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-eighth Day of September, 2010

David J. Kappos
*Director of the United States Patent and Trademark Office*